(12) United States Patent  
Killian et al.

(10) Patent No.: US 8,667,106 B2
(45) Date of Patent: Mar. 4, 2014

(54) APPARATUS FOR BLOCKING MALWARE ORIGINATING INSIDE AND OUTSIDE AN OPERATING SYSTEM

(75) Inventors: Thomas Killian, Westfield, NJ (US); David Kormann, Morristown, NJ (US); Christopher Rice, Parsippany, NJ (US); Norm Schryer, New Providence, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 934 days.

(21) Appl. No.: 11/134,574

(22) Filed: May 20, 2005

(65) Prior Publication Data

US 2006/0265486 A1 Nov. 23, 2006

(51) Int. Cl.
*G06F 15/16* (2006.01)

(52) U.S. Cl.
USPC ............ 709/223; 709/217; 709/218; 709/219

(58) Field of Classification Search
USPC ................................ 709/220–223; 726/3–15
See application file for complete search history.

(56) References Cited

U.S. PATENT DOCUMENTS

| | | | | |
|---|---|---|---|---|
| 5,475,839 | A * | 12/1995 | Watson et al. | ...................... 713/2 |
| 5,896,499 | A * | 4/1999 | McKelvey | ...................... 726/11 |
| 6,212,635 | B1 * | 4/2001 | Reardon | ...................... 713/165 |
| 6,629,145 | B1 | 9/2003 | Pham | |
| 6,678,827 | B1 | 1/2004 | Rothermel | |
| 6,757,723 | B1 | 6/2004 | O'Toole | |
| 6,832,256 | B1 | 12/2004 | Toga | |
| 6,839,850 | B1 | 1/2005 | Campbell | |
| 6,874,084 | B1 | 3/2005 | Dobner | |
| 7,284,104 | B1 * | 10/2007 | Wu et al. | ........................ 711/162 |
| 7,630,381 | B1 * | 12/2009 | Roskind et al. | ........... 370/395.42 |
| 2003/0145061 | A1 * | 7/2003 | Kochiya | ........................ 709/208 |
| 2004/0019807 | A1 * | 1/2004 | Freund | ........................ 713/201 |
| 2004/0165588 | A1 * | 8/2004 | Pandya | ........................ 370/389 |
| 2005/0015615 | A1 * | 1/2005 | Gonsalves et al. | ............ 713/200 |
| 2005/0086512 | A1 | 4/2005 | Lee et al. | |

FOREIGN PATENT DOCUMENTS

| | | | |
|---|---|---|---|
| EP | 1564623 | A | 8/2005 |
| WO | 9929066 | A | 6/1999 |

OTHER PUBLICATIONS

IEEE 100 The Authoritative Dictionary of IEEE Standards Terms 7th Ed., 2000, p. 767.*

* cited by examiner

*Primary Examiner* — Djenane Bayard
(74) *Attorney, Agent, or Firm* — Myers Bigel Sibley & Sajovec, PA

(57) ABSTRACT

A management system for a guard chip. The guard chip is adapted to prevent malware communications between a user operating system and an external network without user interaction. The management system comprises an authentication function to authenticate interactions between the guard chip and the management system with each communication, an update function to provide updates to the guard chip without user interaction, and a control function to prevent users control of the guard chip. The management system can comprise an administrator to create the updates.

14 Claims, 1 Drawing Sheet

APPARATUS FOR BLOCKING MALWARE ORIGINATING INSIDE AND OUTSIDE AN OPERATING SYSTEM

FIELD

The present embodiments relate generally to a system that is administered by experts to prevent viruses, malware, worms, spyware and DDoS attacks on user operating systems.

BACKGROUND

The Internet suffers from problems like malware, spam, viruses, worms, and DDoS attacks.

Any part of a computer under the control of a user can be appropriated by malware when a user installs software on the computer. Often the appropriation of the computer is imperceptible to the user of the computer.

Dell™ notes that 20% of all customer care calls are due to malware, and average $30 per call. Corporate losses due to malware are in the billions of Dollars. About 80% of all corporations have reported infiltrations of their corporate network by malware or spyware. A single personal computer infected with spyware takes an IT department anywhere from two hours to many days to repair. The cost of associated with spam has risen from $10 billion in 2003 to an estimated $22 billion in 2005.

In September, 2004 about 30,000 personal computers per day were infected with or participated in the infection of other computers with malware, spam, spyware, or were subjected to or participated in DDoS attacks.

Many entities are well suited to discover and diagnose spam, viruses, worms and DDoS attacks. Examples of these entities are AOL, MSN, Comcast, McAfee, AT&T and MCI. The goal of the embodiments of this invention is to allow these well suited entities to administer the security on personal computers through knowledge gained running their vast networks.

There is a need for a system that can adapt to new threats, that cannot be by-passed by the user of the user operating system, and that also prevents threats from reaching critical components of a user operating system.

The present embodiments meet these needs.

SUMMARY

In one embodiment, the invention comprises a management system.

In another embodiment, the invention comprises a user operating system with a malware prevention component.

The user operating system can prevent malware from communicating with the user operating system. The user operating system is further adapted to communicate with and authenticate a management system located remote to the user operating system. The management system can optionally include an administrator for managing a guard chip. The management system can be adapted to communicate with and update the guard chip to prevent malware being transmitted by the user operating system, being received by the user operating system or both, without user interaction.

These are some embodiments of the invention, and additional elements and broader embodiments may be described below.

BRIEF DESCRIPTION OF THE DRAWINGS

The detailed description will be better understood in conjunction with the accompanying drawings as follows.

Figure 1:
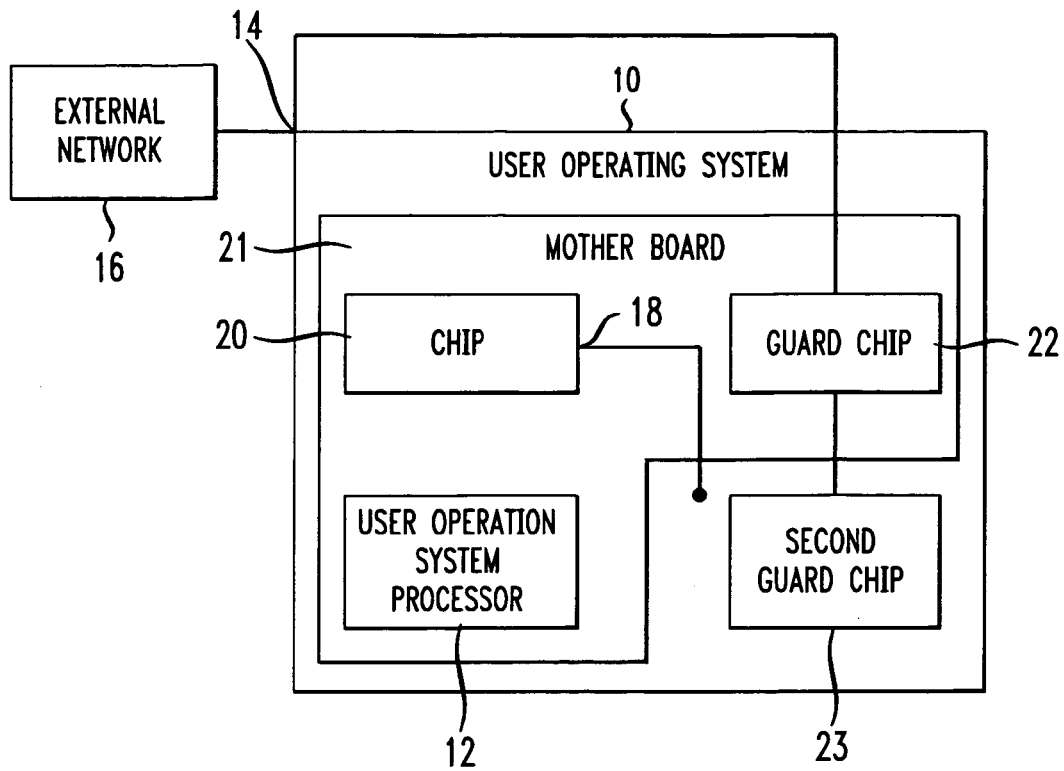
FIG. 1 depicts a user operating system for preventing the spread of malware according to the invention.

The present embodiments are detailed below with reference to the listed Figures.

DETAILED DESCRIPTION OF THE EMBODIMENTS

Before explaining the embodiments in detail, it is to be understood that the invention is not limited to the particular embodiments and that the invention can be practiced or carried out in various ways.

The embodiments of the current invention are for a system, controlled by experts, which can be added to a personal computer or other device with a user operating system. These experts are focused on Secure Internet Access, not general purpose services or applications programs. This invention adds a new, securely-managed interface/layer to the user operating system.

One of the benefits is that a user can securely use a computer without the spreading of malware from the internet to a user operating system, or from the user operating system to another user operating system.

Another benefit is that with the user operating system, a management system run by an expert can remotely maintain a guard chip installed on the operating system of a user. This method enables only qualified experts to access and properly administer the guard chip.

An embodiment of the invention can be a management system for a guard chip. The guard chip is adapted to prevent malware communications between a user operating system and an external network. The guard chip also prevents user interaction with the settings of the guard chip. It will be understood in some embodiments according to the invention that to the extent the management system can include software, such software is provided as a non-transitory computer readable medium storing software.

The management system comprises an authentication function to authenticate interactions between the guard chip and the management system with each communication. The management system also comprises an update function to provide updates to the guard chip without user interaction, and a control function to prevent users' control of the guard chip.

Once the guard chip is in place for Internet security, on the operating system there are a two added benefits: (1) the guard chip can direct all web surfing and email to a secure portal, using SSL or IPSEC, (2) all links can be scrubbed for malware, or any other type of harmful software.

In one embodiment, a web page can be constructed for enabling a user to engage the guard chip, and control internet access. For example the administrator can enable the guard chip to turn internet access "off" when reading email or when the user is opening documents such as Word, Powerpoint and Excel. When the user is done reading email, or opening the file, the user can click "on" and get a report on all attempts made to send data out while Internet access was "off". This allows users to both block such transmissions caused by spyware and to see which applications are causing the transmissions to be sent.

Another benefit of the system involves use of the management system to monitor traffic into the guard chip of every computer or device with a guard chip, to allow quick detection of new malware. Malware is typically distributed in three waves: first a small test, second a larger test and finally full implantation. It is contemplated that embodiments using a large number of guard chips can be more likely to detect the malware at the first test and then the guard chips can be updated to detect the new malware before the third wave, full distribution is implemented.

Another embodiment of the invention can be for a user operating system for preventing malware from communicating with the user operating system. The user operating system comprises a guard chip in communication with a processor of the user operating system. The guard chip is adapted to prevent malware communications between the user operating system and an external network, authenticate interactions between the user operating system and the remote management system, and receive updates from the management system.

The user operating system can be a computer, or a device such as a router or a cellular phone.

Another embodiment of the invention can be for a method of controlling data transfers using a user operating system. The method comprises the steps of first preventing malware from communicating with the user operating system. After that, the next step is allowing a management system access to the user operating system for updating a guard chip without user interaction. Then, controlling the guard chip using the management system; and authenticating communications between the user operating system and the management system using the guard chip. The steps of the method can be carried out in various orders and are not limited to the order the steps are listed in.

The method allows administrators access to the user operating system for updating the guard chip without user interaction using a management system. Administrators are authorized persons for maintaining the guard chip, and may perform the updating of the guard chip, as well as installing additional programs on the guard chip.

The method involves preventing non-administrators privileged access to the guard chip. Non-administrators are authorized users to configure the guard chip for communication with the management system. "Privileged access" means instantiating service, instantianting or revoking access rights, services to the guard chip, including installing bug fixes, installing user identification profiles for other users to identify themselves.

The method includes the step of controlling non-privileged access by non-administrators to the guard chip. The controlling of the non-privileged access can include controlling access such as to configure the connection to the external network. As examples, if the external network communicates through a cable modem it would typically use the dynamic host configuration protocol (DHCP) to obtain its external network address, whereas with a digital subscriber line (DSL) connection, the user would typically have to enter account information to obtain an external network address, using a protocol known as point-to-point-protocol over Ethernet (PPPoE). The method can also include the step of authenticating users of the user operating system, which can be a computer, using the management system and the guard chip. This authentication is performed by the management system and the guard chip so that the connection for updating the guard chip is secure. Specifically the authentication steps would be entering a user name and password, or using a device like a secure ID™ token produced by RSA Security of Massachusetts.

Additionally, the method involves the step of automatically updating the guard chip using the management system. The management system can automatically update the system when a user requests a new service or feature for the guard chip.

The management system includes a copy of the data from the nonvolatile memory of the guard chip. The data can include user identification information, operating system specifications, authorization access grants from a third party, revocation of access grants from a third party, and combinations thereof. Should the guard chip be destroyed the data on the management system would still be available. This is a significant benefit of the method and system of the invention.

It is contemplated that the method for controlling data transfer can control data transfer over at least one of the following protocols; Hypertext Transfer Protocol (HTTP), Simple Mail Transfer Protocol (SMTP), Remote Terminal Protocol (Telnet), and File Transfer Protocol (FTP).

Additionally, the method can include securely instantiating the guard chip prior to initiating any other step to identify the guard chip and services to be provided by the guard chip. Instantiating can be through use of a security chip like model DS2432 available from Dallas Semiconductor of Dallas, Tex., installed on the guard chip. As described in the webpage from Dallas Semiconductor of Apr. 20, 2005 this security chip is termed a shared secret identification chip in this application: "The DS2432 model chip combines 1024 bits of EEPROM with a 64-bit secret and 512-bit secure hash algorithm (SHA-1) engine to provide a high level of authentication based security to the guard chip at a low cost. To modify data in the DS2432 the 1-Wire™ host must successfully compute and transmit a 160-bit SHA-1 message authentication code (MAC) that requires prior knowledge of the DS2432 chip including the undisclosed 64-bit secret identifier. The DS2432 chip also provides a read memory command which automatically computes and delivers a 160-bit MAC to the 1-Wire™ host. Again, this sequence uses the undisclosed secret identifier and is a very effective solution for host authentication of the DS2432 based chip".

Updates of the guard chip can comprise an additional virus signature, a bug fix, a new chip features specific to a given user, or combinations thereof. The updating can be by a cryptographically secure protocol. The cryptographically secure protocol can be Secure Socket Layer (SSL), or Secure Shell (SSH).

Another embodiment of the invention can be for a device to prevent malware from communicating with a user operating system. The device comprises a guard chip that is (i) non-removably connected to the user operating system, (ii) in communication with an external network, and (iii) in communication with a management system. The guard chip comprises at least one guard processor with volatile working storage, and a non-volatile memory connected to the at least one guard processor.

The guard chip can be updated, authenticated and controlled from a management system that is isolated from or remote to the user operating system. The management system can be isolated from the user operating system by I/O channel, or virtual machine (VM) layer.

Examples of volatile working storage are synchronous dynamic random access memory (SDRAM) from Micron of Taiwan. Examples of non-volatile memory are flash memory from Intel of California.

The guard chip is adapted for preventing malware communications between the user operating system and the external network, authenticating communications with the management system, and receiving updates from the management system. The user cannot control the functions guard chip.

The communication with the external network includes a transmission of malware from the user operating system to the external network, a reception of malware from the external network by the user operating system, or combinations thereof.

Referring to the Figures, FIG. 1 depicts a user operating system for preventing malware from transmitting into the user operating system or spreading from the user operating system.

The user operating system (10) includes at least one user operating system processor (12), a first I/O port (14) that interfaces to an external network (16) and a second I/O port (18) for communicating with at least one chip (20) disposed on a motherboard (21). An example of a motherboard usable in this invention is a Pentium™ motherboard available from Intel of California. The chip (20) can be a user controllable chip. The user operating system processor (12) can be located on the mother board (21) as shown in the figure.

The processor can be any one of a number of types of processors, including but not limited to video processors, audio processors, flight simulators, game processors, other processors, and combinations thereof. An example of a processor usable in this invention is a video processor from ATI of California, an audio processor from Creative Labs of California.

Disposed on the motherboard can be a non-removable guard chip (22). The guard chip can be for use in filtering communication through the first I/O port (14) to or from the user operating system and the external network.

The external network can be another user operating system disposed on another computer. Alternatively, the external network can be the Internet, a home local area network, a business local area network, a corporate area network, and combinations thereof. It can be a secure connection on demand.

The user operating system can be disposed on a personal computer, or it can be on a server or other device. Examples of other devices are personal digital assistants (PDAs).

A second guard chip (23) can be optionally attached to a device with a user operating system that is not a full computer. The device can be a hard drive, a flash drive, a removable storage drive, or combinations thereof. This second guard chip can prevent access to the device by unauthorized parties.

The guard chip can be configured to block specified ports known for transmitting malware. Examples of specified ports that can always be blocked are those protecting the user's personal computer from Microsoft Netbios filesharing, and from Network Time Protocol (NTP) servers attacks. Additionally communication ports, such as transmission control protocol (TCP) and user datagram protocol (UDP) ports can be blocked with the guard chip.

The following list gives exemplary ports that can be blocked with the guard chip.

| Port | Service |
|---|---|
| 123 | network time protocol (NTP) (get time from a trusted server, e.g., over a VPN). |
| 137 | netbios name service |
| 138 | netbios datagram service |
| 139 | netbios session service |
| 445 | microsoft-ds |

The last 4 ports can block the operating system from sending out data stored on the user operating system.

Figure 2:
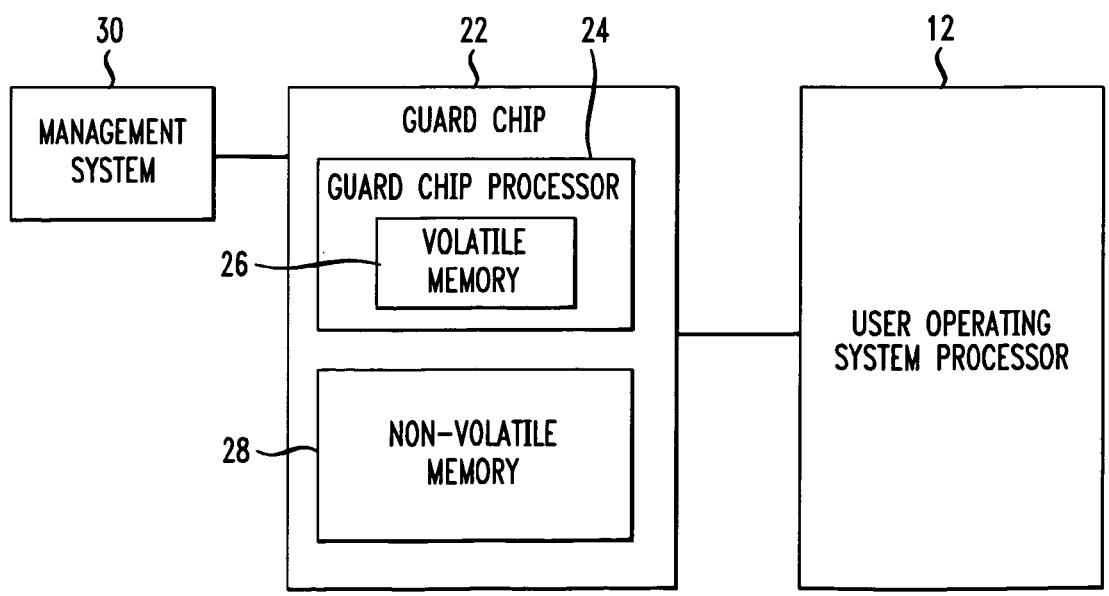
FIG. 2 depicts an embodiment of a guard chip according to the invention.

FIG. 2 shows an embodiment of a guard chip. In this Figure, the guard chip includes at least one guard processor (24) with volatile working storage (26); and a non volatile memory (28). The guard chip is in communication with the user operating system processor (12). An example of the guard chip processor is a Strong ARM processor.

The guard chip includes basic software for preventing the entry into the operating system of malware and for preventing the spread of malware, but can also comprise additional virus signatures, bug fixes, chip features specific to a given user, and combinations of these elements. An example of a chip feature specific to a given user or user operating system can be a linking feature to create at least one virtual private network.

A Virtual Private Network (VPN) alters the personal computer's software or alters the internet protocol (IP) stack to encrypt traffic going out and decrypt traffic coming into the user operating system.

The VPN software applications can help secure a user operating system. During the 10-20 seconds of a personal computer boot or shutdown processes, when the VPN applications are not running, the personal computer and its IP stack are open to attack. This means that the user operating system can be compromised during boot or shutdown of the user operating system.

By running the VPN using a guard chip, the user operating system cannot be compromised during boot/shutdown, since the guard chip can block all IP traffic at such times.

Another feature of the guard chip can be implementing a check-pointed file system, where the user management system can "freeze" the personal computer's file system so that it can be restored at any time in the future, to a state when there were no problems with the file system. This function can be integral to the operating system and file system, enabling user mistakes, and infections, to be un-done. This is a significant benefit to the system. These mistakes and infections occur when a file is opened that is infected or a website is visited that downloads undesired software onto the computer or user operating system.

The check-pointed file system can be implemented by the guard chip using from about 10% to about 20% of the personal computer's disk space.

The guard chip can also be used to check newer processors for infections. For example, Advanced Micro Devices (AMD®) has a hardware vulnerability in the model K8 processor. The K8 processor comprises a microcode store that can be updated without an authentication check. The guard chip can check a processor's microcode to be sure the microcode has not been infected.

FIG. 2 shows the guard chip (22) communicating with a management system (30) located remote to the user operating system. The guard chip and the management system authenticate each other every time the guard chip and the management system interact.

The management system updates the guard chip without user interaction. The updates performed by the management system can be transmitted by a cryptographically secure protocol, such as a SSH or SSL protocol.

One embodiment of the management system can be a distributed management system. A number of parties can be given access to the guard chip, such as ISPs, Internet Carriers, personal computer Vendors and corporate IT staff for employee personal computers.

To understand the method for an embodiment that allows for distributed management of the guard chip, a Condo Model of management can be offered. For example a Condo Manager, a trusted agent, is chosen by the user. The Condo Manager is typically the ISP serving the user's home, such as Comcast™ or Verizon™, or the IT staff supporting an employee's personal computer. As other parties want access to the guard chip functions, such as Dell's™ Customer Care organization, these other parties become Condo Tenants, whose terms and conditions of use are determined by the Condo Manager. For example, Dell™ can issue commands on the personal computer via the guard chip, but not affect the guard chip's security policies. Hospitals and other healthcare organizations are examples of other groups who can benefit greatly from the guard chip, in managing compliance with HIPPA rules. Other Condo Tenants can be parties for selected services, such as Email service or Web services.

The user can administer the Condo Manager and the Condo Tenants using a secure sockets layer (SSL) connection to a guard chip web page.

The management system can include user identification information such as such as an identifier created by the user, like Wendy@Buskoplaw.com. The management system can include operating system specifications, such as revision levels, and cryptographic hashes of the boot block or other sensitive areas on a hard disc. The management system can include at least one authorization access grant from at least one third party, such as an X.509 certificate indicating access to a specific VPN. The management system can include at least one revocation of those authorization access grants from at least one third party such as an X.509 certificate revocation list, and combinations of these elements.

Malware which is intended to be filtered and prevented from spreading and from entering the user operating system can be in the form of a virus, junk mail, a worm, a Trojan horse, spyware, or combinations of these items. Other malware is also preventable by this remotely controllable guard chip.

In another embodiment, it is contemplated that the guard chip is adapted to identify at least one specific user and filter and/or enable communications based on the identified specific user. The guard chip can do this by first having the user log into the guard chip with a password like the RSA secure ID, then second enabling the features of the logged in user. It is contemplated that an authentication interaction can occur at every interaction of the guard chip with the management system. In another embodiment, it is contemplated that an authentication interaction can occur before updating by an administrator is accepted by the guard chip. It is also contemplated that authentication can occur automatically at preset defined internals.

It is also contemplated that the authentication interaction can be performed using an authentication protocol. The management system can use preshared key, a RSA signature, or an X.509 certificates to identify itself to the guard chip.

While these embodiments have been described with emphasis on the embodiments, it should be understood that within the scope of the appended claims, the embodiments might be practiced other than as specifically described herein.

PARTS LIST

User Operating System (10)
User Operating System Processor (12)
First I/O Port (14)
External Network (16)
Second I/O Port (18)
At Least one chip (20)
Motherboard (21)
Guard Chip (22)
Second Guard Chip (23)
At least one guard chip processor (24)
Volatile Working Storage (26)
Non-Volatile Memory (28)
Management System (30)

What is claimed is:

1. An apparatus comprising:
a user operating system processor to execute an operating system; and
a guard chip coupled to the user operating system processor and to block a communication port available to the user operating system processor so as to block outgoing malware communication that originates with the operating system from being communicated from the operating system and to block incoming malware communication that originates outside the operating system from reaching the operating system, the guard chip to block access to the communication port for a time period, to identify an application that attempts to access the communication port during the time period responsive to access to the communication port being blocked, and to allow access to the communication port at an expiration of the time period;
wherein a duration of the time period is defined responsive to input from a user of the apparatus turning the guard chip on and off; and
wherein the guard chip and the user operating system processor are disposed on a common circuit board.

2. The apparatus according to claim 1, further comprising:
an input-output port coupled to the user operating system processor and the guard chip, the operating system to use the input-output port to communicate with an external network.

3. The apparatus according to claim 2, wherein the guard chip is communicatively coupled to a remote system in the external network, the remote system to allow only an administrator privileged user of the operating system to configure the guard chip to block the communication port.

4. The apparatus according to claim 1 wherein the guard chip is further to allow only the administrator privileged user to configure the guard chip via the external network using a cryptographically secure protocol.

5. The apparatus according to claim 1 further comprising:
a volatile memory operatively coupled to the guard chip; and
a non-volatile memory operatively coupled to the guard chip.

6. The apparatus of claim 1, wherein the guard chip is further operable to maintain a backup file system used by the user operating system processor and to replace a present file system used by the user operating system processor with the backup file system.

7. A method for managing communication associated with a user operating system processor, comprising:
providing a guard chip that is coupled to the user operating system processor, the guard chip being configured to detect malware and the user operating system processor being configured to execute an operating system;
authenticating communication between the guard chip and a management system;
updating the guard chip with malware definitions through the management system without user interaction;
configuring the guard chip to block a communication port available to the user operating system processor so as to block outgoing malware communication that originates with the operating system from being communicated from the operating system and to block incoming malware communication that originates outside the operating system from reaching the operating system;
using the guard chip to block access to the communication port for a time period, to identify an application that attempts to access the communication port during the time period responsive to access to the communication port being blocked, and to allow access to the communication port at the expiration of the time period;

wherein a duration of the time period is defined responsive to input from a user turning the guard chip on and off; and wherein the guard chip and the user operating system processor are disposed on a common circuit board.

8. The method of claim 7, wherein the management system is remote to the user operating system processor.

9. The method of claim 7, wherein updating the guard chip with malware definitions comprises updating the guard chip with a virus signature.

10. the method of claim 7, wherein updating the guard chip with malware definitions comprises using a cryptographically secure protocol.

11. The method of claim 10, wherein the cryptographically secure protocol is secure socket layer.

12. The method of claim 10, wherein the management system is a distributed management system.

13. The method of claim 10, wherein the guard chip is communicatively coupled to a remote system in an external network, the remote system being operable to allow only an administrator privileged user of the operating system to configure the guard chip to block the communication port.

14. The method of claim 7, further comprising:

using the guard chip to maintain a backup file system used by the user operating system processor and to replace a present file system used by the user operating system processor with the backup file system.

\* \* \* \* \*